(12) United States Patent
Dickerson et al.

(10) Patent No.: US 9,715,378 B2
(45) Date of Patent: Jul. 25, 2017

(54) AUTOMATED SOFTWARE UPDATE SCHEDULING

(71) Applicant: INTERNATIONAL BUSINESS MACHINES CORPORATION, Armonk, NY (US)

(72) Inventors: Scott S. Dickerson, Austin, TX (US); James C. Fletcher, Apex, NC (US); Chakkalamattam J. Paul, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 14/132,912

(22) Filed: Dec. 18, 2013

(65) Prior Publication Data

US 2015/0169311 A1  Jun. 18, 2015

(51) Int. Cl.
*G06F 9/44* (2006.01)
*G06F 9/445* (2006.01)

(52) U.S. Cl.
CPC ...................... *G06F 8/65* (2013.01)

(58) Field of Classification Search
None
See application file for complete search history.

(56) References Cited

U.S. PATENT DOCUMENTS

| | | | |
|---|---|---|---|
| 7,886,200 B1 * | 2/2011 | Hernacki | G06F 11/008 714/48 |
| 8,321,858 B1 * | 11/2012 | Marmaros | G06F 8/65 717/173 |
| 2002/0152105 A1 * | 10/2002 | Dan | G06Q 10/06 718/100 |
| 2003/0135858 A1 * | 7/2003 | Nemoto | H04H 20/62 725/75 |
| 2005/0113942 A1 * | 5/2005 | Longsdorf | G05B 9/02 700/79 |
| 2005/0132382 A1 * | 6/2005 | McGuire | G06F 8/68 719/311 |
| 2008/0177554 A1 * | 7/2008 | Srinivasan | G06F 8/76 717/100 |
| 2009/0300595 A1 * | 12/2009 | Moran | G06F 8/65 717/170 |

(Continued)

FOREIGN PATENT DOCUMENTS

WO   WO 2014088567 A1 *  6/2014  .............. G06F 8/65

OTHER PUBLICATIONS

Syed Masud Mahmud et al, "Secure Software Upload in an Intelligent Vehicle via Wireless Communication Links", Intelligent Vehicles Symposium, 2005. Proceedings. IEEE.

(Continued)

*Primary Examiner* — Daxin Wu
(74) *Attorney, Agent, or Firm* — Stephen J. Walder, Jr.; Richard A. Wilhelm

(57) ABSTRACT

A method, system or computer usable program product for scheduling a software update affecting vehicle functionality based on usage patterns including tracking usage patterns of a vehicle; automatically determining a time window for scheduling a software update that affects vehicle functionality to the vehicle based on the tracked usage patterns; and applying software updates to the vehicle during the scheduled time window.

20 Claims, 9 Drawing Sheets

(56) References Cited

U.S. PATENT DOCUMENTS

| | | | | |
|---|---|---|---|---|
| 2010/0082559 A1* | 4/2010 | Sumcad | ............... | G06F 8/65 |
| | | | | 707/695 |
| 2011/0275321 A1* | 11/2011 | Zhou | ............... | H04M 1/6091 |
| | | | | 455/41.2 |
| 2011/0307882 A1* | 12/2011 | Shiba | ............... | G06F 8/65 |
| | | | | 717/173 |
| 2011/0307958 A1* | 12/2011 | Ashton | ............... | G06F 21/105 |
| | | | | 726/26 |
| 2013/0265178 A1* | 10/2013 | Tengler | ............... | H04W 4/00 |
| | | | | 340/989 |

OTHER PUBLICATIONS

David Zax, "A Software Update for Your Car?", MIT Technology Review, Mar. 6, 2012, found on the world wide web at: http://www.technologyreview.com/view/427153/a-software-update-for-your-car/.

"Software-Related Vehicle Recall Analysis", Hughes Telematics, Inc., 2013, found on the world wide web at: http://www.hughestelematics.com/pp/whitepapers/autowp.php.

\* cited by examiner

FIG. 6A

| Software Update ID (601) | Software Update Type (602) | Update Version (603) | Update Granularity (604) | Update Requirements (605) |
|---|---|---|---|---|

FIG. 6B

| Software Diagnostic ID (611) | Diagnostic Type (612) | Diagnostic Version (613) | Diagnostic Granularity (614) | Diagnostic Requirements (615) |
|---|---|---|---|---|

FIG. 6C

| VIN (621) | Vehicle Type (622) | Software Status (623) |
|---|---|---|

FIG. 6D

| User Identifier (631) | User Preferences (632) | User Capabilities (633) |
|---|---|---|

FIG. 6E

| VIN (641) | Software Update ID (642) | Detailed Information (643) |
|---|---|---|

| 701 | 702 | 703 | 704 | 705 | 706 | 707 | 708 | 709 |
|---|---|---|---|---|---|---|---|---|
| Software Update ID | Software Update Type | Update Version | Granularity | Software Diagnostic ID | Diagnostic Type | Diagnostic Version | Update and Diagnostic Requirements | Update Schedule |

| 711 | 712 | 713 |
|---|---|---|
| User Identifier | User Preferences | User Capabilities |

| 721 | 722 | 723 | 724 | 725 | 726 | 727 |
|---|---|---|---|---|---|---|
| Period Start | Period End | Period Type | Location(s) | Wireless Capabilities | Wireless Security | Other Information |

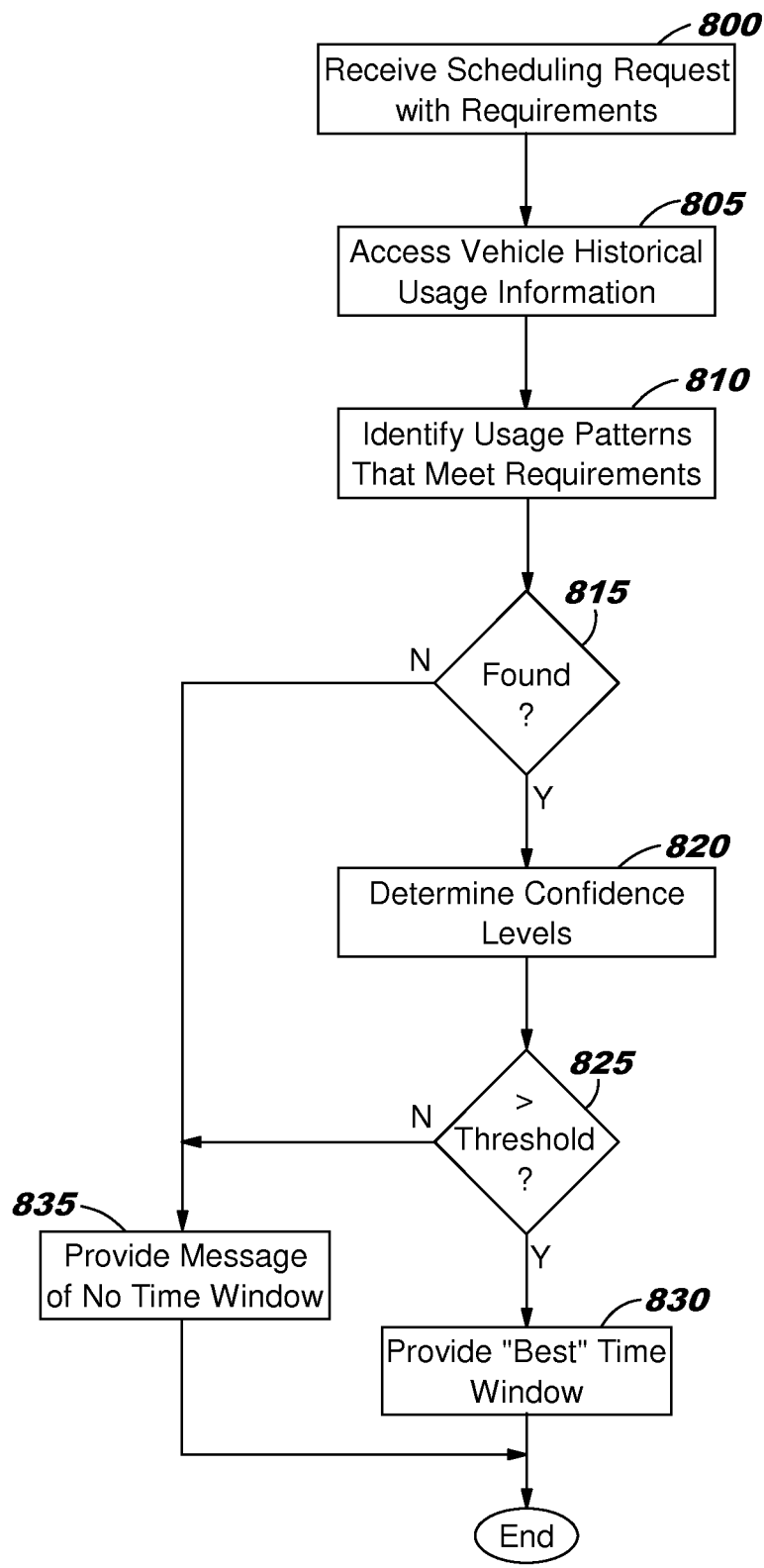

| Start | End | Type | Location | Wireless | Security | Other |
|---|---|---|---|---|---|---|
| 12/1/13 8:30 | 12/1/13 16:30 | Off | B | None | - | - |
| 12/1/13 16:30 | 12/1/13 16:57 | Active | - | - | - | - |
| 12/1/13 16:57 | 12/2/13 8:15 | Off | A | 802.11g | Secure | Plugged |
| 12/2/13 8:15 | 12.2.13 8:30 | Active | - | - | - | - |
| 12/2/13 8:30 | 12/2/13 16:30 | Off | B | None | - | - |
| 12/2/13 16:30 | 12/2/13 16:45 | Active | - | - | - | - |
| 12/2/13 16:45 | 12/2/13 17:45 | Off | C | 802.11b | Non-Secure | - |
| 12/2/13 17:45 | 12/2/13 18:00 | Active | - | - | - | - |
| 12/2/13 18:00 | 12/3/13 8:30 | Off | A | 802.11b | Secure | Plugged |

| Start (Idle) | End (Idle) | Location | Wireless | Security | Other |
|---|---|---|---|---|---|
| 11/30/2013 20:30 | 12/1/2013 8:32 | A | 802.11g | Secure | - |
| 12/1/2013 8:45 | 12/1/2013 8:47 | B | 802.11g | Secure | - |
| 12/1/2013 9:00 | 12/1/2013 9:02 | C | 802.11g | Secure | - |
| 12/1/2013 9:15 | 12/1/2013 9:17 | D | 802.11g | Secure | - |
| 12/1/2013 9:30 | 12/1/2013 9:32 | E | 802.11g | Secure | - |
| 12/1/2013 9:32 | 12/1/2013 11:32 | F | 802.11g | Secure | - |
| 12/1/2013 11:45 | 12/1/2013 11:47 | E | 802.11g | Secure | - |
| 12/1/2013 12:00 | 12/1/2013 12:02 | D | 802.11g | Secure | - |
| 12/1/2013 12:15 | 12/1/2013 12:17 | C | 802.11g | Secure | - |
| 12/1/2013 12:30 | 12/1/2013 12:32 | B | 802.11g | Secure | - |
| 12/1/2013 12:45 | 12/1/2013 12:47 | A | 802.11g | Secure | - |

AUTOMATED SOFTWARE UPDATE SCHEDULING

BACKGROUND

1. Technical Field

The present invention relates generally to automated software update scheduling, and in particular, to a computer implemented method for automated software update scheduling taking into account usage patterns.

2. Description of Related Art

Software is being implemented in most products we use throughout our society. This software provides for better performance, more efficient performance, improved features, greater customization, etc. for these products. However, software may require updates over time to correct identified defects, to improve performance, and to add additional desirable features.

Several methods are utilized for updating software. This can include replacing the software entirely with a new version or making incremental changes to the underlying software. Either approach may be utilized depending on the complexity and size of the software, the manner the software has been stored, and the infrastructure needed to update the software. For example, for an appliance, a semiconductor memory chip containing the software may be replaced in its entirety by an appliance repairman. However, a computer which is frequently connected to the internet may be updated incrementally across that internet connection.

SUMMARY

The illustrative embodiments provide a method, system, and computer usable program product for scheduling a software update affecting vehicle functionality based on usage patterns including tracking usage patterns of a vehicle; automatically determining a time window for scheduling a software update that affects vehicle functionality to the vehicle based on the tracked usage patterns; and applying software updates to the vehicle during the scheduled time window.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIGS. 6A-6E are block diagrams of database records in accordance with the first embodiment;

FIGS. 7A-7C are block diagrams of database records in accordance with the second embodiment;

FIG. 8 is a flow diagram of scheduling a software update in which various embodiments may be implemented; and FIGS. 9A-9B are tables of historical vehicle usage data for use in identifying time windows for scheduling software updates in which various embodiments may be implemented.

DETAILED DESCRIPTION

Processes and devices may be implemented and utilized for automated software update scheduling of vehicles. This can be accomplished by tracking usage patterns of a vehicle and scheduling software updates when certain requirements are expected to be met. For example, the software update may require that the vehicle be off for a certain time window with secure access to a wireless connection. Statistical analysis of historical data can provide predictions of when these requirements should be met and the software update is scheduled accordingly. These processes and apparatuses may be implemented and utilized as will be explained with reference to the various embodiments below.

Figure 1:
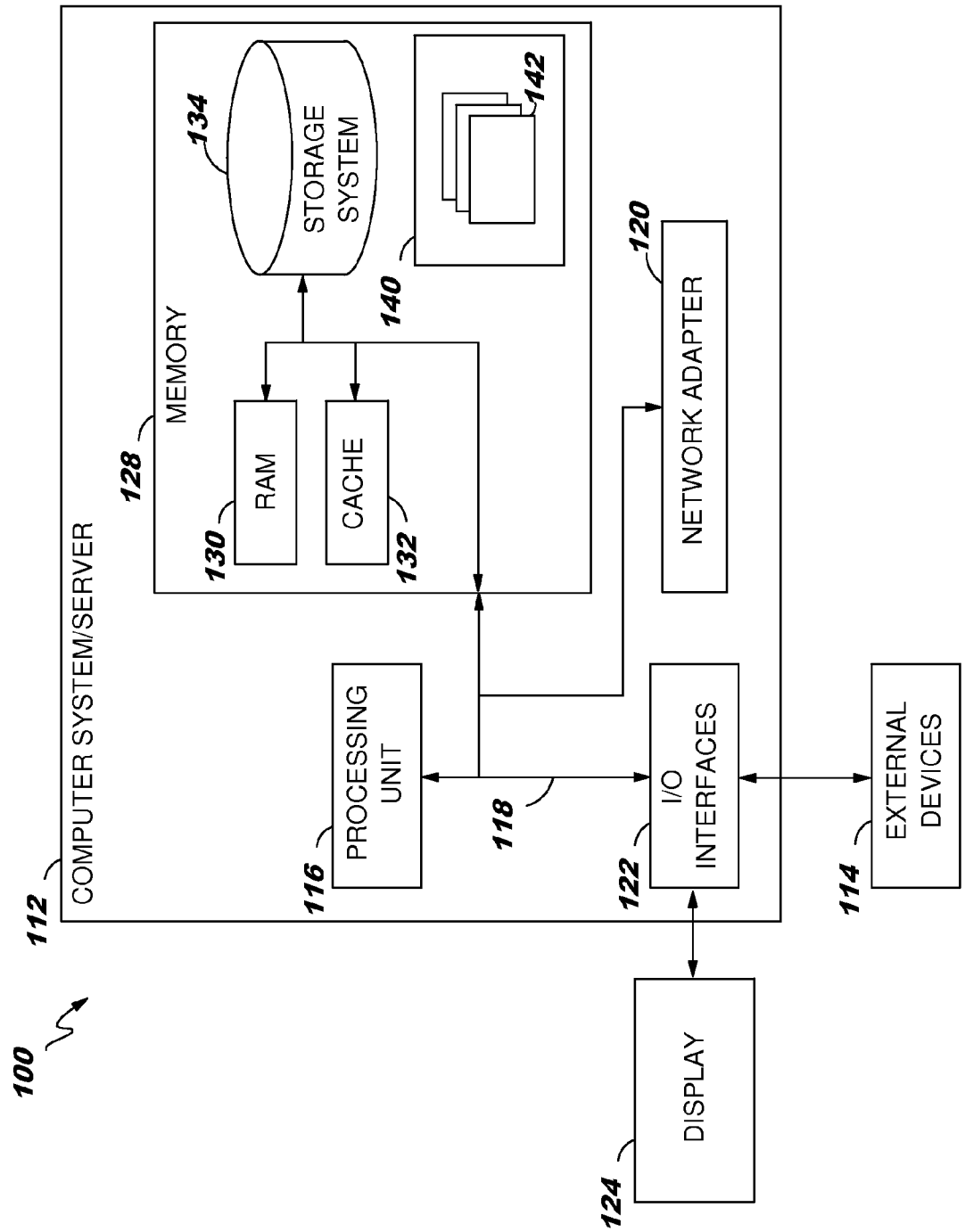
FIG. 1 is a block diagram of an illustrative data processing system in which various embodiments of the present disclosure may be implemented.

FIG. 1 is a block diagram of an illustrative data processing system in which various embodiments of the present disclosure may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein such as automated software update scheduling.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of non-transitory computer system usable media. Such media may be any available media that is accessible by computer system/server 112, and it includes both volatile and non-volatile media, removable and non-removable media.

System memory 128 can include non-transitory computer system usable media in the form of volatile memory, such as random access memory (RAM) 130 and/or cache memory 132. Computer system/server 112 may further include other non-transitory removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for automated software update scheduling.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
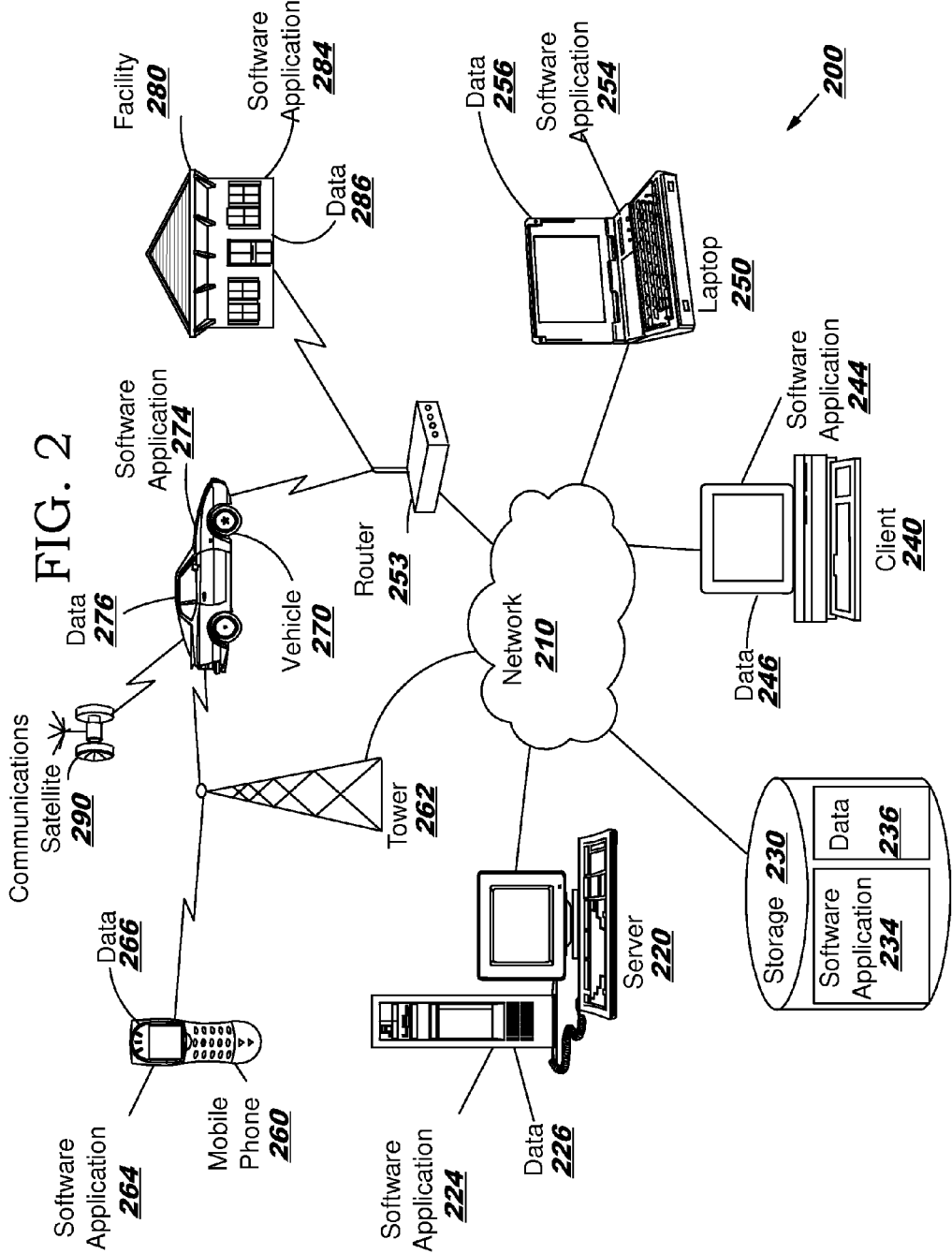
FIG. 2 is a block diagram of an illustrative network of data processing systems in which various embodiments of the present disclosure may be implemented.

FIG. 2 is a block diagram of an illustrative network of data processing systems in which various embodiments of the present disclosure may be implemented. Data processing environment 200 is a network of data processing systems such as described above with reference to FIG. 1. Software applications such as for automated software update scheduling may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250, vehicle 270 and facility 280 (such as a home or business) are coupled to network 210 including wirelessly such as through a network router 253. A mobile phone 260 and vehicle 270 may be coupled to network 210 through a mobile phone tower 262. Vehicle 270 may also be connected to network 210 through a satellite 290. Data processing systems, such as server 220, client 240, laptop 250, mobile phone 260, vehicle 270 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for automated software update scheduling or other software applications and data in accordance with embodiments described herein. Storage 230 may contain software application 234 and a content source such as data 236 for automated software update scheduling. Other software and content may be stored on storage 230 for sharing among various computer or other data processing devices. Client 240 may include software application 244 and data 246. Laptop 250 and mobile phone 260 may also include software applications 254 and 264 and data 256 and 266. Vehicle 270 and facility 280 may include software applications 274 and 284 as well as data 276 and 286. Other types of data processing systems coupled to network 210 may also include software applications. Software applications could include a web browser, email, or other software application for automated software update scheduling.

Server 220, storage unit 230, client 240, laptop 250, mobile phone 260, vehicle 270 and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, software patches and applications to client 240, laptop 250 and vehicle 270. Server 220 may be a single computer system or a set of multiple computer systems working together to provide services in a client server environment. Client 240 and laptop 250 may be clients to server 220 in this example. Client 240, laptop 250, mobile phone 260, vehicle 270 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3:
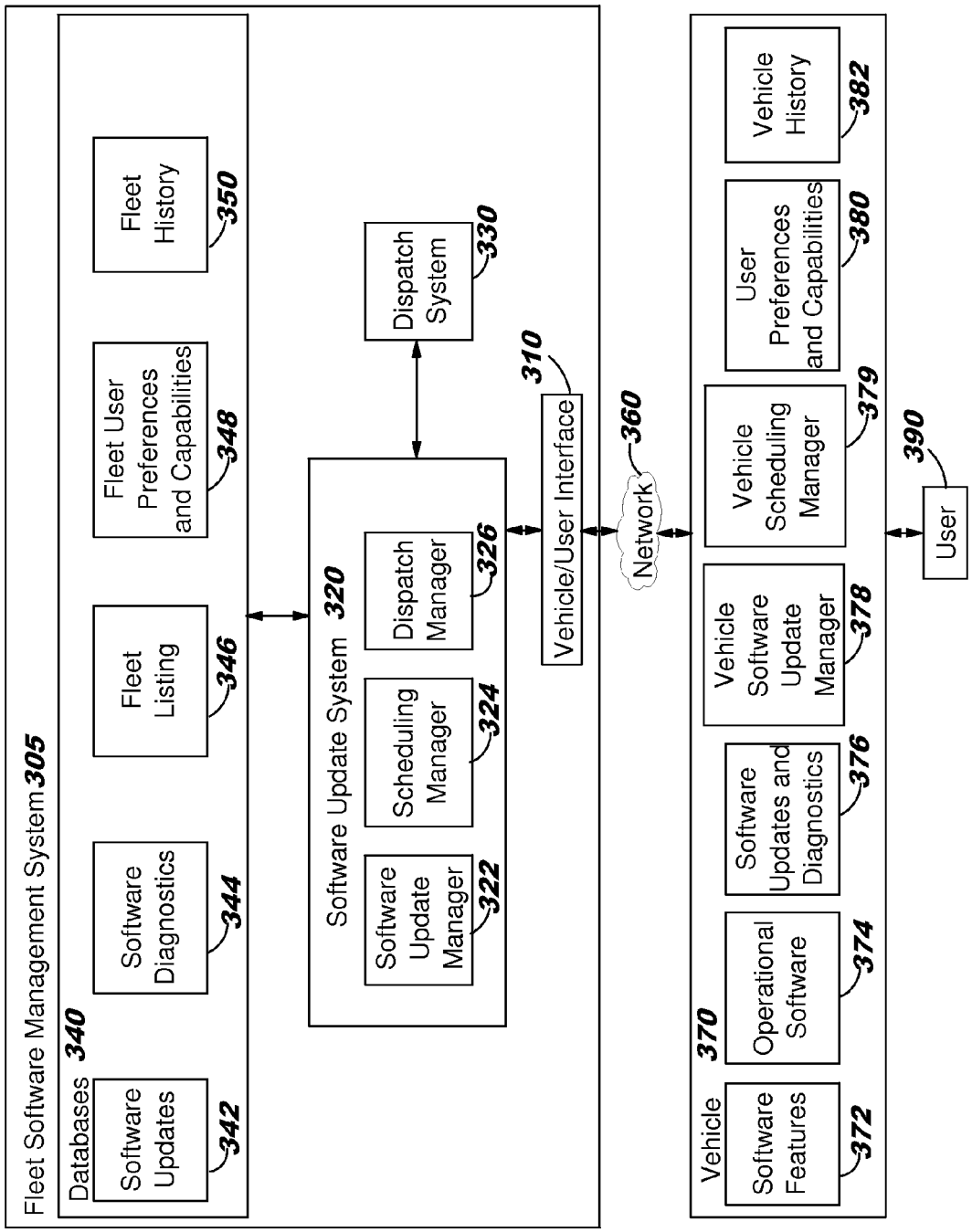
FIG. 3 is a block diagram of a software management system in which various embodiments may be implemented.

FIG. 3 is a block diagram of a software management system in which various embodiments may be implemented. The software management system includes a fleet software management system 305 which can track and manage the current software status of a fleet of vehicles such as vehicle 370. This can include providing software updates. A software update may be a software patch to correct or improve a set of software items such as a software bug or an improved security feature. A software update may also be a software upgrade such as a new version of a software operating system or application. A software update may also be a new feature that the user has ordered or which the vehicle manufacturer or seller has provided to the user. Software updates can be to critical software components such as braking control systems or to non-critical software components such as radio features. Software updates may also be time critical such as where a software safety issue is identified (e.g. stuck accelerator issue under certain circumstances) and requires an immediate patch or non-critical such as adding a minor feature upgrade.

Fleet software management system 305 communicates across a network 360 with a fleet of vehicles such as vehicle 370 and user 390 (also referred to herein as owner or driver) to update software in vehicle 370. Fleet software management system 305 may be implemented on a single server, multiple servers or even in a cloud implementation. Network 360 may be the internet or other communication network and can include wireless networks, cellular communications, satellite communications, etc. Vehicle 370 may be an automobile, suburban utility vehicle (SUV), minivan, van, pick-up truck, commercial truck, motorcycle, snowmobile, all-terrain vehicle (ATV), forklift, boat, ship, airplane, drone or other type of vehicle which includes software that may need to be patched or otherwise updated over time.

Fleet software management system 305 includes a user interface 310, a software update system 320, a dispatch system 330, and databases 340. User interface 310 communicates with vehicles such as vehicle 370 across network 360. User interface 310 also handles communications from software update system 320 to user 390 regarding software updates. This can be accomplished through a vehicle navigation display, auditory instructions when the vehicle is turned on, etc. Software update system 320 utilizes databases 340 to manage updates to vehicle software across a fleet a vehicles. Software update system 320 also communicates with dispatch system 330 where needed in case a software update causes a vehicle to not perform properly.

Software update system 320 includes several software modules including a software update manager 322, a scheduling manager 324, and a dispatch manager 326. Software update manager 322 manages updates to software of vehicles such as vehicle 370, which is described in greater detail below. Software update manager 322 can determine that a vehicle needs a set of software updates based on available updates, vehicle diagnostics, customer orders, etc. Software update manager 322 then communicates through vehicle/user interface 310 with vehicle 370 and user 390 as needed to schedule and implement those software updates. Scheduling manager 324 is utilized by software update manager to schedule software updates by utilizing vehicle history (vehicle usage patterns) and user preferences.

In case of a failed software update where the vehicle is not functional or safe to drive, software update manager 322 can invoke dispatch manager 326 to communicate with dispatch system 330 to dispatch a courtesy vehicle, tow truck, and/or technicians as needed to the location of the vehicle. This reduces any inconvenience to the user until the vehicle is functional and safe to drive. While an occasional dispatch may be costly, it may be much less costly, monetarily or in customer satisfaction, than requiring all vehicles to come to a dealership to software updates.

Databases 340 include software updates 342, software diagnostics 344, fleet listing 346, fleet user preferences and capabilities 348 and fleet history 350. Software updates 342 include software updates available for vehicles across the fleet. This can include software patches, upgrades, features, etc. This can also include different granularities of updates. For example, a software update may include a single update or several updates depending on scheduling requirements. This is referred to herein as dynamic granularity. This allows flexibility in scheduling the updates. Software diagnostics 344 include a variety of diagnostics and tests which can be downloaded and run on a vehicle before or after software updates. These diagnostics can determine whether a software update is needed or if a software update has been properly implemented. These diagnostics can also be utilized for diagnosing other issues of a vehicle such as prior to or after vehicle maintenance and repairs. Software diagnostics can also be considered as software updates.

Fleet listing 346 includes a listing of all vehicles in the fleet and includes the vehicle type and a current software status of each vehicle such as software versions, applications, features, etc. This is useful for determining which vehicles may need upgrades, patches, etc. as they become available. Fleet user preferences and capabilities 348 include any user preferences and capabilities specific for each vehicle. For example, some customers may prefer updates as soon as they are available and they have wireless connectivity at home to allow such immediate updates whereas other customers may prefer only emergency or safety updates performed as needed to operational software and they may have limited wireless capabilities. In such a case, updates may only occur when the customer parks near a retail establishment with free wireless connectivity. Other customers may have satellite radio and can have updates downloaded in that manner. The home location of the user may also be stored in this database for use in analyzing the best location to perform a software update uninterrupted as described below. In an alternative embodiment, user preferences and capabilities may not be centrally stored in databases 340 with that information stored in each vehicle instead. In another alternative embodiment, some summary user preferences may be stored centrally with more detailed information stored in each vehicle.

Fleet history 350 is a history of vehicle software updates with scheduling information for each software update based on vehicle usage patterns. Over time, this provides expected software update scheduling for each vehicle and can provide fleet wide information regarding software update capability requirements, which can be useful for rolling out updates. For example, if most vehicles are updated at about the same time of day or night, then capabilities to handle that workload need to be provided. In addition, software updates may be rolled out to a portion of the fleet at a time depending on software update capabilities. In an alternative embodiment, fleet history database 350 may not be centrally stored in databases 340 with that information stored in each vehicle instead. In another alternative embodiment, some summary fleet history may be stored centrally with more detailed information stored in each vehicle.

Vehicle 370 can also contain functional software for features and operations of the vehicle, software modules with software update capabilities, and a set of databases for storing software and information. This can include software features 372, operational software 374, software updates and diagnostics database 376, a vehicle software update manager 378, a vehicle scheduling manager 379, user preferences and capabilities database 380, and vehicle history database 382. Software features 372 includes software utilized to manage or run the features of the vehicle such as navigation, voice recognition, radio, fuel economy display, etc. This software can be disabled or malfunction without affecting the safe functioning of the vehicle. Much of this software is updatable, but may include some software that is not updatable. Operational software 374 includes software used in the operation of the vehicle such as braking management, steering management, collision avoidance software, etc. This software is critical to the proper and safe functioning of the vehicle and cannot be disabled or otherwise malfunctioning. Some of this software may be updatable and other software not updatable. Collectively the software features and operational software affect the functionality of the vehicle.

Software updates and diagnostics 376 can include a variety software updates and diagnostics to be performed in the near future. By storing these software and diagnostics locally, software updates can be performed even when the vehicle is not connected to software update system 320. For example, if the best time to schedule a software update (followed by software diagnostics to confirm that the software updates were properly updated) is at night at the user's home, but the user does not have wireless connectivity, then the software can still be updated at that time without connectivity. However, software updates to operational software may require wireless connectivity when performed in case the update fails and a rollback to the previous software version is not possible. This database may not be included in all vehicles, but may be a useful capability.

Vehicle software update manager 378 and vehicle scheduling manager 379 are software modules which can perform many of the same functions as software update manager 322 and scheduling manager 324 for vehicle 370. This allows for greater distribution of the software update process across the fleet, but requires the implementation of greater capabilities across many vehicles. The difference is that the software and diagnostics to be performed must be downloaded and instructions provided to the vehicle software update manager to perform the update(s). In addition, such updates may require wireless connectivity when an update is performed if the update is to operational software that may be critical to the proper and safe functioning of the vehicle. This wireless connectivity allows for the dispatch of support vehicles and personnel if needed. In some embodiments, vehicle software update manager and vehicle scheduling manager 379 may not be included in vehicle 370 in more centrally managed implementations.

Fleet user preferences and capabilities 380 include any user preferences and capabilities specific for each vehicle. This can include the location of the user's home or business and wireless security capabilities at those locations. These locations of the user are stored for use in analyzing the best location to perform a software update uninterrupted as described below. Vehicle history 382 includes vehicle usage history useful for identifying usage patterns for scheduling software updates. That is, regular downtimes for the vehicle may be identified. For example, the vehicle may always be off during the middle of the night at home where wireless capability is available or during the middle of the day at the user's place of business where there are no wireless capabilities available. There may be wireless capability at the user's workplace, but the vehicle may not have the proper authorization to utilize that wireless capability or the wireless capability may not be secure enough for providing software updates.

Alternative embodiments may utilize alternative database and software management configurations. For example, software update system 320 may include additional software management capabilities or all such capabilities may be implemented in a single module. Software update system 320 may also be combined with user interface 310. Databases 340 may be combined in alternative configurations, such as separating user preferences and capabilities 348 into two separate databases. Additional or different information may be collected and stored for use in each database.

Figure 4:
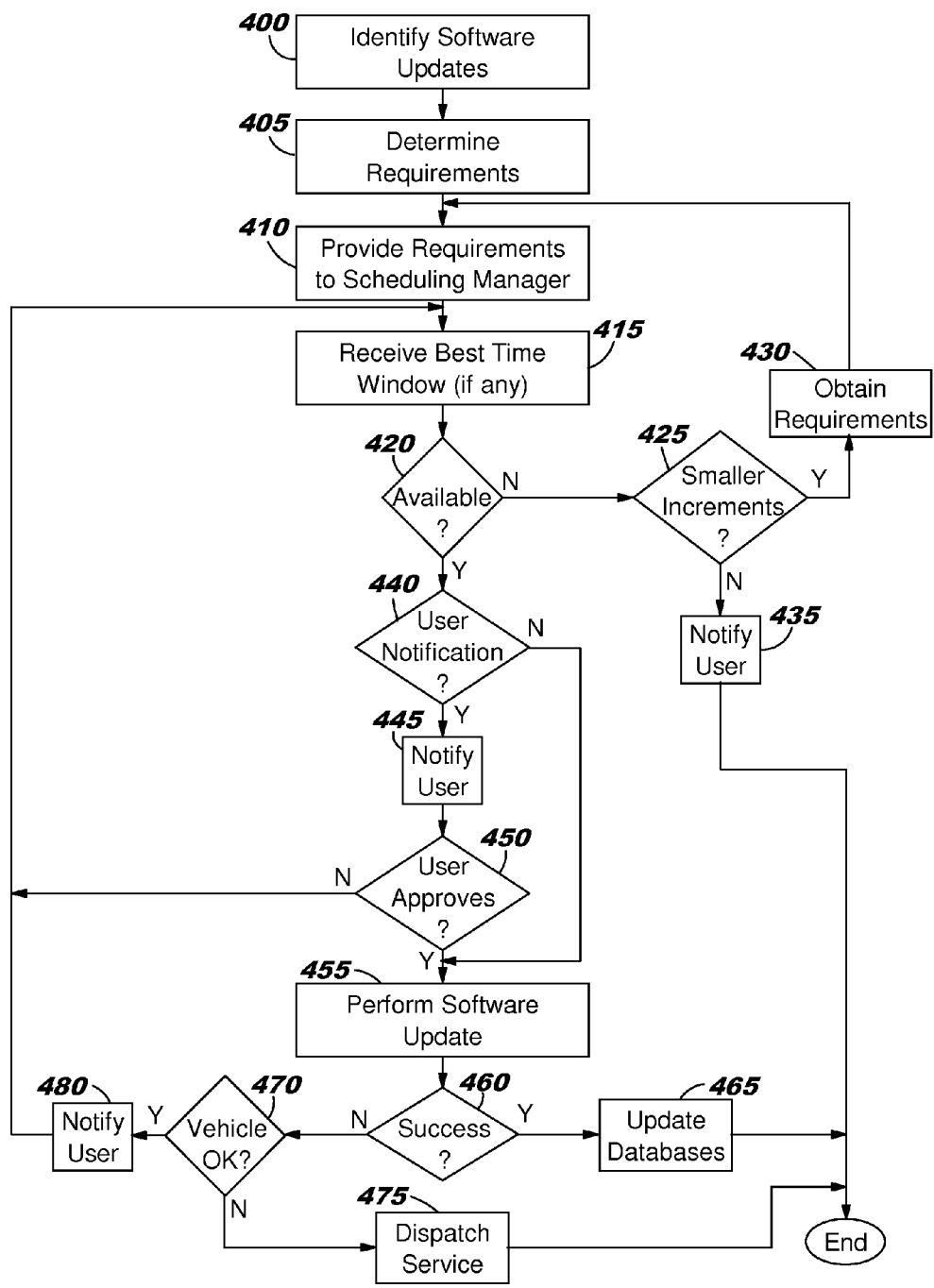
FIG. 4 is a flow diagram of a centralized software update system in accordance with a first embodiment.

FIG. 4 is a flow diagram of a centralized software update system in accordance with a first embodiment. In this embodiment, the scheduling of software updates and the scheduled software updates and diagnostics are performed centrally such as by fleet management system 305. In this embodiment, the process flow is directed by a centralized software update manager such as software update manager 322. In this embodiment, the vehicle may not have a vehicle software update manager or a vehicle scheduling manager.

In a first step 400, software updates needed for a vehicle or vehicles are identified. This can be accomplished by comparing the software updates available to the fleet listing and determining that certain vehicles need software updates. This can also be accomplished by instructions or other communications received by the software update manager from external sources such as from a user making a purchase of an additional software feature or a communication from an owner of the software management system providing notification of a safety recall software update. In a second step 405, a set of requirements for updating the software are determined. This can include the length of time for the update including diagnostics, bandwidth requirements, wireless security requirements, proximity to a dealership should a dispatch be required, whether there are any other timing requirements such as whether this is a safety update that needs immediate action, etc. These requirements may be included with the update as stored in a software updates database.

In a third step 410, the requirements are provided to the scheduling manager to identify time windows when the software update can be performed. Then in step 415, the scheduling manager identifies and provides a best proposed time window to the software update manager including whether providing a notification there is no time window that meets the requirements. This time window can be based on statistical analysis of vehicle usage such as when a vehicle is turned off and other requirements are met to determine a time window with a high probability of not being interrupted. The best time window meets all the requirements and has the highest probability of not being interrupted. In step 420, if there is no time window that fits the requirements processing continues to step 425, otherwise processing continues to step 440. In step 425, it is determined whether the same update can be provided in smaller increments. That is, it is determined whether an alternative set of updates are provided in the software updates database with more granularity that accomplish the same result. This is a process referred to herein as dynamic granularity. If yes in step 425, then in step 430 the first of the set of alternative software updates are obtained from the software updates database with a set of requirements for updating the software and processing returns to step 410. If no in step 425, then in step 435 the user is notified through the vehicle user interface that the vehicle needs to be taken to a dealer for a software update. Alternatively, the user may be provided the requirements and asked if those requirements could be met by a change in routine. The fleet listing is also updated with the software update scheduling issue. After step 435, processing ceases.

In step 440, a vehicle usage time window meeting the requirements for a software update has been identified. In this step, it is determined whether prior user notification and approval is needed. For feature improvements or minor software updates that do not affect critical functions of the vehicle and which can be interrupted easily, no prior user notification or approval may be needed. For major software updates, especially if critical functions are affected, user notification and approval may be needed. For example, the user may have an early flight planned the morning of a scheduled substantial software update and no notification could create a substantial burden to the user. If no user notification and approval is needed, then processing continues to step 455, otherwise processing continues to step 445. In step 445, the user is notified through the vehicle/user interface of the need for a scheduled software update with the scheduled time window for performing the update. The in step 450, it is determined whether the user approves. If not, then processing returns to step 415, otherwise processing continues to step 455.

In step 455, the scheduled software update is performed during the scheduled time window if the software update is available and the vehicle is located in the desired location with the requirements met. This can include contacting the vehicle to download the software update and diagnostics, offloading the current software to temporary storage in case a reversion is needed, performing the software update and diagnostics, and if there are any issues, performing a rollback or reversion to the software prior to the software update. Then in step 460, it is determined whether the software update was successful. This can include determining whether the software update performed as expected without interruption. For example, a failed software update can be a failed diagnostic or is the update was interrupted by the user needing use of the vehicle necessitating a quick reversion of the software. If yes in step 460 (a successful software update), then in step 465 the fleet listing is updated with information regarding the successful software update and processing ceases. If no in step 460 (a failed software update), then in step 470 it is determined whether the vehicle can function safely. If not, then in step 475 the dispatch manager is contacted to dispatch service vehicles, a message is sent to the user through the vehicle user interface, the fleet listing database is updated with the software update issues, and processing ceases. If yes in step 470, then in step 480 the user is notified of the software issue, the fleet listing database is updated with the software update issues, and processing returns to step 415 to schedule another software update. Alternatively, the user can be asked to bring the vehicle to a local dealer at his or her convenience.

Figure 5:
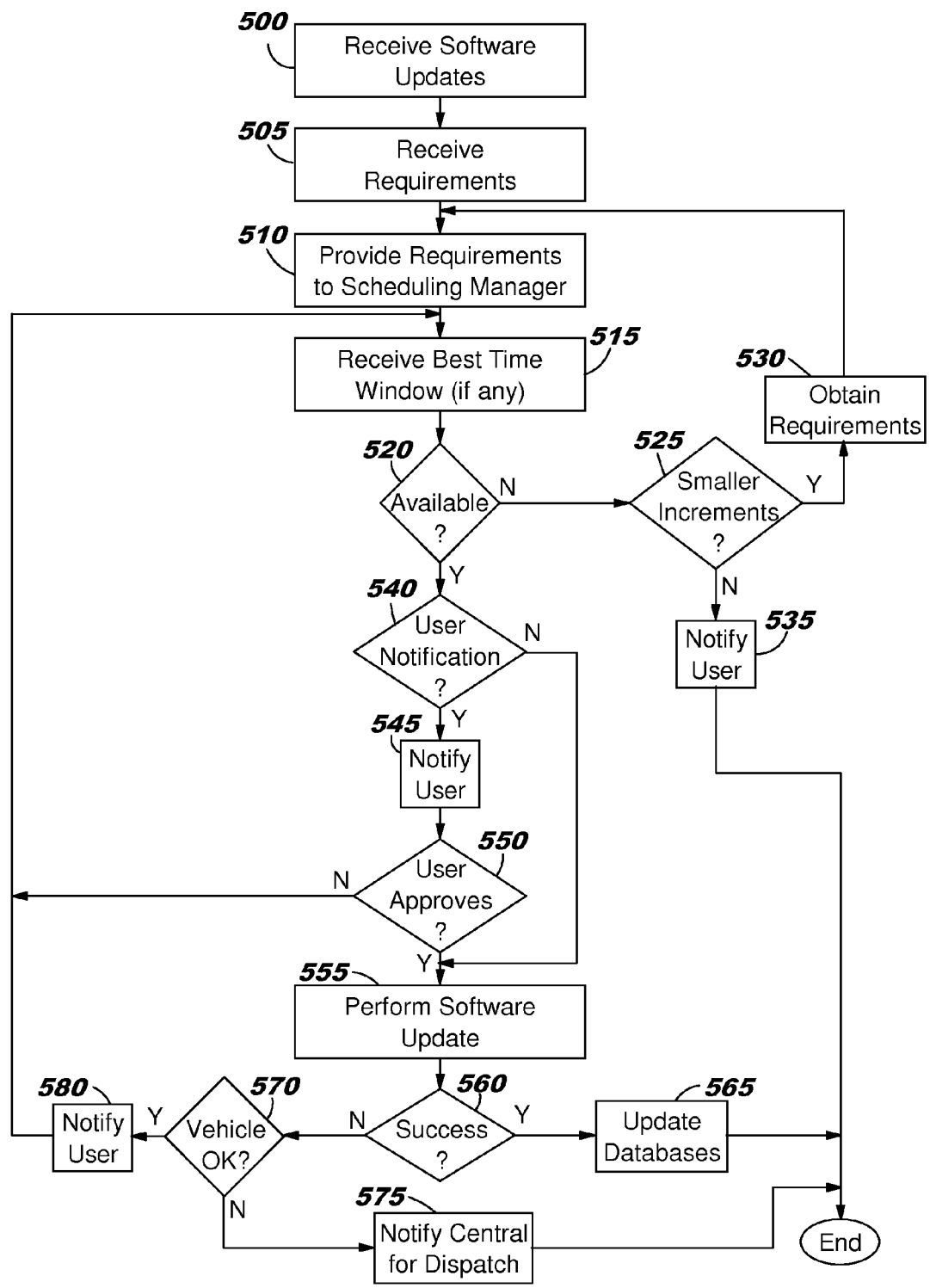
FIG. 5 is a flow diagram of a decentralized software update system in accordance with a second embodiment.

FIG. 5 is a flow diagram of a decentralized software update system in accordance with a second embodiment. In this embodiment, the scheduling of software updates and the scheduled software updates and diagnostics are performed locally by a software update manager located in the vehicle such as vehicle software update manager 378. The vehicle software update manager may be directed by a centralized software update manager such as software update manager 322. In this embodiment, the vehicle has a vehicle software update manager or a vehicle scheduling manager.

In a first step 500, software updates needed for a vehicle or vehicles are received by the vehicle software update manager from the central system. This may result from the central system comparing the software updates available to the fleet listing and determining that certain vehicles need software updates. This can also be accomplished by instructions or other communications received by the vehicle software update manager from external sources such as from a user making a purchase of an additional software feature or a communication from an owner of the software management system providing notification of a safety recall software update. In a second step 505, a set of requirements for updating the software are received. This can include the length of time for the update including diagnostics, bandwidth requirements, wireless security requirements, proximity to a dealership should a dispatch be required, whether there are any other timing requirements such as whether this is a safety update that needs immediate action, etc. These requirements may be included with the update when received.

In a third step 510, the requirements are provided to the scheduling manager to identify time windows when the software update can be performed. Then in step 515, the scheduling manager identifies and provides a best proposed time window to the software update manager including whether providing a notification there is no time window that meets the requirements. This time window can be based on statistical analysis of vehicle usage such as when a vehicle is turned off and other requirements are met to determine a time window with a high probability of not being interrupted. The best time window meets all the requirements and has the highest probability of not being interrupted. In step 520, if there is no time window that fits the requirements processing continues to step 525, otherwise processing continues to step 540. In step 525, it is determined whether the same update can be provided in smaller increments. That is, it is determined by querying the central system whether an alternative set of updates are provided in the software updates database with more granularity that accomplish the same result. This is a process referred to herein as dynamic granularity. If yes in step 525, then in step 530 the first of the set of alternative software updates are obtained from the software updates database with a set of requirements for updating the software and processing returns to step 510. If no in step 525, then in step 535 the user is notified through the vehicle user interface that the vehicle needs to be taken to a dealer for a software update. Alternatively, the user may be provided the requirements and asked if those requirements could be met by a change in routine. The fleet listing is also updated with the software update scheduling issue. After step 535, processing ceases.

In step 540, a vehicle usage time window meeting the requirements for a software update has been identified. In this step, it is determined whether prior user notification and approval is needed. For feature improvements or minor software updates that do not affect critical functions of the vehicle and which can be interrupted easily, no prior user notification or approval may be needed. For major software updates, especially if critical functions are affected, user notification and approval may be needed. For example, the user may have an early flight planned the morning of a scheduled substantial software update and no notification could create a substantial burden to the user. If no user notification and approval is needed, then processing continues to step 555, otherwise processing continues to step 545. In step 545, the user is notified through the vehicle/user interface of the need for a scheduled software update with the scheduled time window for performing the update. The in step 550, it is determined whether the user approves. If not, then processing returns to step 515, otherwise processing continues to step 555.

In step 555, the scheduled software update is performed during the scheduled time window if the software update is available and the vehicle is located in the desired location with the requirements met. This can include contacting the vehicle to download the software update and diagnostics, offloading the current software to temporary storage in case a reversion is needed, performing the software update and diagnostics, and if there are any issues, performing a rollback or reversion to the software prior to the software update. Then in step 560, it is determined whether the software update was successful. This can include determining whether the software update performed as expected without interruption. For example, a failed software update can be a failed diagnostic or is the update was interrupted by the user needing use of the vehicle necessitating a quick reversion of the software. If yes in step 560 (a successful software update), then in step 565 the central system is notified of the successful update which may then be stored by the central system in a fleet listing. Processing then ceases. If no in step 560 (a failed software update), then in step 570 it is determined whether the vehicle can function safely. If not, then in step 575 the central system is contacted to dispatch service vehicles and a message is sent to the user through a user interface such as the navigation system. The central system may also update the fleet listing database with the software update issues. Processing then ceases. If yes in step 570, then in step 580 the user is notified of the software issue and the central system is notified of the issue. The central system may update the fleet listing database with the software update issue. Processing then returns to step 515 to schedule another software update. Alternatively, the user can be asked to bring the vehicle to a local dealer at his or her convenience.

FIGS. 6A-6E are block diagrams of database records in accordance with the first embodiment. A record is a set of information within a domain or database that establishes a relationship between a set of data or data elements. A record may be a separate entry into a database, a set of links between data, or other logical relationship between a set of data. FIG. 6A is a block diagram of a record 600 stored in a software update database. FIG. 6B is a block diagram of a record 610 stored in a software diagnostics database. FIG. 6C is a block diagram of a record 620 stored in a fleet listing database. FIG. 6D is a block diagram of a record 630 stored in a fleet user preferences and capabilities database. FIG. 6E is a block diagram of a record 640 stored in a fleet history database.

FIG. 6A is a block diagram of a record 600 stored in a software update database. Record 600 includes a software update identifier 601, a software update type 602, a software update version 603, a software update granularity 604, and software update requirements 605. Software update identifier 601 provides an identification of the software update such as whether the software update is to a specific application. Software update type 602 is a descriptor of whether the software update is an improved version of existing software, a software upgrade, whether the software update is to a critical function or not, etc. Software update version 603 identifies the version of an update. For example, version 2.1 is a later version than 2.0, so version 2.1 would not be updated with version 2.0. Software update granularity 604 allows for dynamic granularity as described above. For example, the same software update may come in two versions, one as a single large update and the other as two smaller updates. This field provides the capability to distinguish between the various granularities such as by using "1" for larger granular updates and "2" for smaller granular updates. Software update requirements 605 includes any requirements for implementing this update such as length of time needed for the update, security requirements (some updates may require higher security), prior update versions, whether the update is for critical features such as dispatch capabilities may be needed, specific diagnostics needed before or after the update, etc.

FIG. 6B is a block diagram of a record 610 stored in a software diagnostics database. Record 610 includes a software diagnostic identifier 611, a diagnostic type 612, a diagnostic version 613, a diagnostic granularity 614, and any diagnostic requirements 615. Software diagnostic identifier 611 provides an identification of the software diagnostic such as whether the software diagnostic is to a specific software update. Diagnostic type 612 is a descriptor of whether the diagnostic is for a software update, diagnosing a specific issue, whether the diagnostic is for a critical function or not, etc. Diagnostic version 613 identifies the version of a diagnostic. Diagnostic granularity 614 allows for dynamic granularity as described above. Diagnostic requirements 605 includes any requirements for implementing this diagnostic software such as length of time needed for the diagnostics, security requirements (some updates may require higher security), prior versions, whether the diagnostic is for critical features such as dispatch capabilities may be needed, etc.

FIG. 6C is a block diagram of a record 620 stored in a fleet listing database. Record 620 includes a vehicle identification number (VIN) 621, a vehicle type 622, and software status 623 of that vehicle. VIN 621 is a unique identifier of vehicles. VIN numbers are standardized for all licensed vehicles such as cars and trucks. Other types of vehicles should have some sort of manufacturer serial number if a VIN is not available. Vehicle type 622 includes whether the vehicle is a car, truck, etc. with the make, model and year of that vehicle plus any other information which may be helpful in determining the software needs of that vehicle. Software status 623 includes the current installed versions or software installed in that vehicle including whether there have been any software update issues. For example, if a specific version of an update was not implemented sue to scheduling conflicts or due to an error in installation, that information can be stored here for tracking purposes.

FIG. 6D is a block diagram of a record 630 stored in a fleet user preferences and capabilities database. Record 630 includes a user identifier or identifiers 631 if the vehicle has more than one user. This can include than name and other identifying information of the user(s). Also included are any user preferences 632 such as a preference to implement updates as soon as they are available or a preference to only perform emergency or safety updates as needed to operational software. Also included are user capabilities 633 such as a home and business location with a description of the wireless connectivity at each location. Other customers may have satellite radio and can have updates downloaded in that manner.

FIG. 6E is a block diagram of a record 640 stored in a fleet history database. There may be one record for each successful software update performed for each vehicle. Alternative embodiments may include unsuccessful software updates in this database or utilize alternative database configurations. Record 640 includes a VIN 641, a software update ID 642, and detailed information 643. VIN 641 is the same number used in record 620 and allows for cross-linkage with the other database. Software update ID 642 is the same software update ID used in the software updates database and allows for cross-linkage with the other database. Detailed information 643 provides the date and time of a successful software update including any other scheduling or other information based on vehicle usage patterns or requirements. This provides expected software update scheduling for each vehicle and can provide fleet wide information regarding software update capability requirements, which can be useful for rolling out updates. For example, if most vehicles are updated at about the same time of day or night, then capabilities to handle that workload need to be provided. In addition, software updates may be rolled out to a portion of the fleet at a time depending on software update capabilities.

FIGS. 7A-7C are block diagrams of database records in accordance with the second embodiment. A record is a set of information within a domain or database that establishes a relationship between a set of data or data elements. A record may be a separate entry into a database, a set of links between data, or other logical relationship between a set of data. FIG. 7A is a block diagram of a record 700 stored in a software update and diagnostics database. FIG. 7B is a block diagram of a record 710 stored in a fleet user preferences and capabilities database. FIG. 7C is a block diagram of a record 720 stored in a vehicle history database.

FIG. 7A is a block diagram of a record 700 stored in a software update and diagnostics database. Record 700 includes the next software update(s) and diagnostic(s) to be performed at a scheduled time on the vehicle. Record 700 includes a software update identifier 701, a software update type 702, a software update version 703, a software update and diagnostic granularity 704, a software diagnostic identifier 705, a diagnostic type 706, a diagnostic version 707, any software update and diagnostic requirements 708, and a schedule time window 709.

Software update identifier 701 provides an identification of the software update such as whether the software update is to a specific application. Software update type 702 is a descriptor of whether the software update is an improved version of existing software, a software upgrade, whether the software update is to a critical function or not, etc. Software update version 703 identifies the version of an update. For example, version 2.1 is a later version than 2.0, so version 2.1 would not be updated with version 2.0. Software update and diagnostic granularity 704 allows for dynamic granularity as described above. For example, the same software update and corresponding diagnostics may come in two versions, one as a single large update and the other as two smaller updates. This field provides the capability to distinguish between the various granularities such as by using "1" for larger granular updates and "2" for smaller granular updates. Software diagnostic identifier 705 provides an identification of the software diagnostic such as whether the software diagnostic is to a specific software update. Diagnostic type 706 is a descriptor of whether the diagnostic is for a software update, diagnosing a specific issue, whether the diagnostic is for a critical function or not, etc. Diagnostic version 707 identifies the version of a diagnostic. Software update and diagnostic requirements 708 includes any requirements for updating the software and implementing the diagnostics such as length of time needed for the diagnostic, security requirements (some updates may require higher security), prior versions, whether the update and diagnostics is for critical features such as dispatch capabilities may be needed, etc. Update schedule 709 includes the scheduled time for performing the software update and diagnostics.

FIG. 7B is a block diagram of a record 710 stored in a vehicle user preferences and capabilities database. Record 710 includes a user identifier or identifiers 711 in case the vehicle has more than one user. This can include than name and other identifying information of the user(s). Also included are any user preferences 712 such as a preference to implement updates as soon as they are available or a preference to only perform emergency or safety updates as needed to operational software. Also included are user capabilities 713 such as a home and business location with a description of the wireless connectivity at each location. Other customers may have satellite radio and can have updates downloaded in that manner.

FIG. 7C is a block diagram of a record 720 stored in a fleet history database. There may be one record for each time the vehicle is turned off and sits without activity and one for each time the vehicle is turned on. This can be utilized by the central scheduling manager or a vehicle scheduling manager to schedule a time window for performing a software update based on vehicle usage. Record 720 includes a data and time the time period starts (e.g. when the vehicle is turned on or off) 721, a data and time the time period stops (e.g., when the vehicle is turned off or on) 722, a type of period (off or on) 723, a location or locations or activity or inactivity 724, a length of time at a location with wireless capabilities 725, any security of those wireless capabilities 726, as well as any other information which may be useful 727.

Time period start 721, time period stop 722 and type of time period 723 quickly identify when the vehicle is started and turned off for purposes of analyzing times for scheduling software updates. Location(s) 724 provide the location of the vehicle and can be utilized to determine whether the vehicle may be at a home, place of business, or other locations. This can be determined from any GPS capabilities or even from the wireless signals received identifying wireless networks of a known location. Time at a location with wireless capabilities 725 is important for determining whether there may be sufficient time for a software update or even for providing information to a central system. For example, a regular stop at a coffee house with wireless capabilities may be sufficient for a minor update or for providing historical information to a central scheduling manager for scheduling a future software update. Wireless security 726 and capabilities 725 at these locations are useful for determining whether any security requirements for a software update can be met at that location. This includes information whether the wireless network is accessible by the vehicle. Other information 727 may be gathered as appropriate for assisting in scheduling software updates or for identifying whether the requirements for those updates may be met.

FIG. 8 is a flow diagram of scheduling a software update in which various embodiments may be implemented. This process can be performed by a centrally located scheduling manager or by a scheduling manager located in a vehicle. In a first step 800, a request to schedule a software update is received from a scheduling manager. This request should include an identifier of the vehicle to receive the software update (such as a VIN) and a set of requirements for performing the software update. These requirements can include the time window required to perform the software update, whether the vehicle needs to be off within the time window, whether the update needs to be performed when the vehicle has wireless access, whether there are any security requirements to that wireless access, a threshold confidence required, etc. In a second step 805, the scheduling manager accesses the operational usage history of the vehicle using the vehicle identifier. That history may be located within the vehicle or centrally in a historical database.

Then in step 810 the scheduling manager then identifies usage patterns within the historical data. That can include daily, weekly, monthly or even annual patterns, although other patterns may be sought. The patterns should be periodic time windows that regularly meet the software update requirements. For example, the vehicle may be parked at a home location with secure wireless access most nights between midnight and 7 a.m. from Sunday night to Thursday night each week. The home location is probably the best location to perform a software update uninterrupted so long as that location meets the requirements. The home location may be identified from a user preferences database or inferred from statistical analysis of the vehicle usage data. However, the home location is a preference and may not be the best location even if the requirements are based in some circumstances. For example, two users that work different shifts may share the same vehicle such that a work or other location may be the best location. Subsequently in step 815, it is determined whether there is one or more usage patterns identified. If not, then processing continues to step 835, otherwise processing continues to step 820.

In step 820, statistical analysis is performed on upcoming time windows within each identified usage pattern that meets the requirements. This statistical analysis is to determine a confidence level or interval whether each time window will be successful without interruption. If the home location meets the requirements and is not does not have a significantly less confidence level, the home location may be initially determined to be the best location. It is also generally preferred that the time window be close to the last likely usage of the vehicle prior to the software update to allow time in case the software update takes longer than expected. Then in step 825, it is determined whether the time window with the highest confidence interval meets the required threshold. If not, then no time window that meets the requirements and processing continues to step 835. Otherwise, in step 830, the time window with the highest confidence (the best window) is identified and provided to the scheduling manager. If no best time window was identified in steps 815 or 825, then in step 835 a message is provided to the scheduling manager that no time window meets the requirements. The scheduling manager can then proceed accordingly.

FIGS. 9A-9B are tables of historical vehicle usage data for use in identifying time windows for scheduling software updates in which various embodiments may be implemented. FIG. 9A is a table 900 of historical usage of an electric car over a period of two days. Actual historical data would include many more days of information, but for illustrative purposes two days of information are shown in this example. In this example, the requirements for a software update are that the electric car be turned off at a single location for at least 2 hours with wireless capabilities and preferably with the vehicle plugged in (to avoid possible battery charge loss during the software update). There are two locations that meet the timing requirements while the vehicle is off, locations B and A. Location B appears to be the place of work and Location A appears to be the home location. Location A is also the only location with wireless capabilities, which meets the requirements, and the vehicle is plugged in which meets a preference. The time window available from these two days of data is from 18:00 to 8:15. Additional days of data may show that the best time window without interruption during would be from 2:00 to 4:00 as the vehicle may be used late night on certain days of the week or early morning on other days. It is generally preferred that the time window be close to the last likely usage of the vehicle prior to the software update to allow time in case the software update takes longer than expected.

FIG. 9B is a table 950 of historical usage of a train traveling from location A to location F and back to location A. In this example, only idle times are collected in the historical data, which is an implementation choice. Actual historical data would include many more days of information, but for illustrative purposes two days of information are shown in this example. In this example, the requirements for a minor software update are that the train be turned off or idle at a single location for a ten minutes with wireless capabilities. There may also be a requirement that the location be either location A or C due to the proximity of service support personnel should then be necessary. Clearly, only location A meets these requirements from just a single day of data. A best time window may be identified from multiple days of data as being from 7:50 to 8:00 because trains often run late, but rarely start early.

The invention can take the form of an entirely software embodiment, or an embodiment containing both hardware and software elements. In a preferred embodiment, the embodiments are implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer usable medium(s) having computer usable program code embodied thereon.

Any combination of one or more computer usable medium(s) may be utilized. The computer usable medium may be a computer usable signal medium or a non-transitory computer usable storage medium. A computer usable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer usable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer usable storage medium may be any tangible medium that can contain, or store a program for use by or in connection with an instruction execution system, apparatus, or device.

A computer usable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer usable signal medium may be a computer usable medium that is not a computer usable storage medium and that can communicate, propagate, or transport a program for use by or in connection with an instruction execution system, apparatus, or device.

Program code embodied on a computer usable medium may be transmitted using any appropriate medium, including but not limited to wireless, wireline, optical fiber cable, RF, etc., or any suitable combination of the foregoing. Further, a computer usable storage medium may contain or store a computer-usable program code such that when the computer-usable program code is executed on a computer, the execution of this computer-usable program code causes the computer to transmit another computer-usable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for automated software update scheduling. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of scheduling a software update affecting vehicle functionality based on usage patterns comprising:
    tracking usage of a vehicle for storage of historical usage patterns in memory, wherein the historical usage patterns comprise usage information indicating a usage of the vehicle during previous periods of time and wireless connectivity information indicating whether wireless connectivity was available during the previous periods of time;
    prior to determining a scheduled time window, determining whether failed completion of the software update would affect the safe functioning of the vehicle;
    upon a positive determination that failed completion of the software update would affect safe operation of the vehicle, establishing a set of requirements that the vehicle be in a predetermined operation state and that wireless connectivity be available during the software update;

utilizing a processor to automatically predict a set of future time periods including date and time and vehicle location, when the set of requirements are met for scheduling a future software update based on the usage information and wireless connectivity information in the historical usage patterns stored in memory;

determining a scheduled time window in the future for performing the software update based on the predicted set of future time periods; and applying the software update to the vehicle during the scheduled time window.

2. The method of claim 1 further comprising:
running diagnostics on the vehicle with updated software; and
responsive to detecting a problem in an operation of the vehicle based on the updated software, automatically restoring a previous version of the software.

3. The method of claim 1 further comprising:
providing a user interface allowing a user to select one of allowing the software update during the scheduled time window and preventing the software update.

4. The method of claim 1 wherein the software updates are applied to the vehicle at a home station during a time frame of historic no usage.

5. The method of claim 1 further comprising:
determining whether vehicle user approval is needed for the software update;
notifying the vehicle user of the scheduled time window; and
upon a positive determination that vehicle user approval is needed for the software update, cancelling the software update if vehicle user approval is not received prior to the scheduled time window.

6. The method of claim 1 wherein tracking usage also includes tracking vehicle location information; and wherein automatically predicting the set of future time periods includes comparing vehicle location information to a set of software update requirements.

7. The method of claim 1 further comprising determining whether there are no future time periods including date and time and vehicle location when the set of requirements are met for scheduling a future software update based on the historical usage patterns stored in memory; and upon a positive determination of no future time periods, splitting the software update into multiple incremental software updates to be scheduled at separate future time periods.

8. The method of claim 7 further comprising:
running diagnostics on the vehicle with updated software; and
responsive to detecting a problem, restoring automatically a previous version;
providing a user interface allowing a user to select one of allowing the software update during the scheduled time window and preventing the software update; and
responsive to detecting a change of vehicle usage during a scheduled time window, suspending the software update;
wherein the software updates are applied to the vehicle at a home station during a time frame of historic no usage.

9. A computer usable program product comprising a non-transitory computer usable storage medium including computer usable code for use in scheduling a software update affecting vehicle functionality based on usage patterns, the computer usable program product comprising code for performing the steps of:
tracking usage of a vehicle for storage of historical usage patterns in memory, wherein the historical usage patterns comprise usage information indicating a usage of the vehicle during previous periods of time and wireless connectivity information indicating whether wireless connectivity was available during the previous periods of time;

prior to determining a scheduled time window, determining whether failed completion of the software update would affect the safe functioning of the vehicle;

upon a positive determination that failed completion of the software update would affect safe operation of the vehicle, establishing a set of requirements that the vehicle be in a predetermined operation state and that wireless connectivity be available during the software update;

utilizing a processor to automatically predict a set of future time periods including date and time and vehicle location when the set of requirements are met for scheduling a future software update based on the usage information and wireless connectivity information in the historical usage patterns stored in memory;

determining a scheduled time window in the future for performing the software update based on the predicted set of future time periods; and applying the software updates to the vehicle during the scheduled time window.

10. The computer usable program product of claim 9 further comprising:
running diagnostics on the vehicle with updated software; and
responsive to detecting a problem in an operation of the vehicle based on the updated software, automatically restoring a previous version of the software.

11. The computer usable program product of claim 9 further comprising:
providing a user interface allowing a user to select one of allowing the software update during the scheduled time window and preventing the software update.

12. The computer usable program product of claim 9 wherein the software updates are applied to the vehicle at a home station during a time frame of historic no usage.

13. The computer usable program product of claim 9 further comprising:
determining whether vehicle user approval is needed for the software update;
notifying the vehicle user of the scheduled time window; and
upon a positive determination that vehicle user approval is needed for the software update, cancelling the software update if vehicle user approval is not received prior to the scheduled time window.

14. The computer usable program product of claim 9 wherein tracking usage also includes tracking vehicle location information; and wherein automatically predicting the set of future time periods includes comparing vehicle location information to a set of software update requirements.

15. A data processing system for scheduling a software update affecting vehicle functionality based on usage patterns, the data processing system comprising:
a processor; and
a memory storing program instructions which when executed by the processor execute the steps of:
tracking usage of a vehicle for storage of historical usage patterns in memory, wherein the historical usage patterns comprise usage information indicating a usage of the vehicle during previous periods of time and wireless connectivity information indicating whether wireless connectivity was available during the previous periods of time;

prior to determining a scheduled time window, determining whether failed completion of the software update would affect the safe functioning of the vehicle;

upon a positive determination that failed completion of the software update would affect safe operation of the vehicle, establishing a set of requirements that the vehicle be in a predetermined operation state and that wireless connectivity be available during the software update;

utilizing the processor to automatically predict a set of future time periods including date and time and vehicle location, when the set of requirements are met for scheduling a future software update based on the usage information and wireless connectivity information in the historical usage patterns stored in memory;

determining a scheduled time window in the future for performing the software update based on the predicted set of future time periods; and applying the software updates to the vehicle during the scheduled time window.

16. The data processing system of claim 15 further comprising:

running diagnostics on the vehicle with updated software; and responsive to detecting a problem in an operation of the vehicle based on the updated software, automatically restoring a previous version of the software.

17. The data processing system of claim 15 further comprising:

providing a user interface allowing a user to select one of allowing the software update during the scheduled time window and preventing the software update.

18. The data processing system of claim 15 wherein the software updates are applied to the vehicle at a home station during a time frame of historic no usage.

19. The data processing system of claim 15 further comprising:

determining whether vehicle user approval is needed for the software update;

notifying the vehicle user of the scheduled time window; and upon a positive determination that vehicle user approval is needed for the software update, cancelling the software update if vehicle user approval is not received prior to the scheduled time window.

20. The data processing system of claim 15 wherein tracking usage also includes tracking vehicle location information; and wherein automatically predicting the set of future time periods includes comparing vehicle location information to a set of software update requirements.

* * * * *